Figure 1:
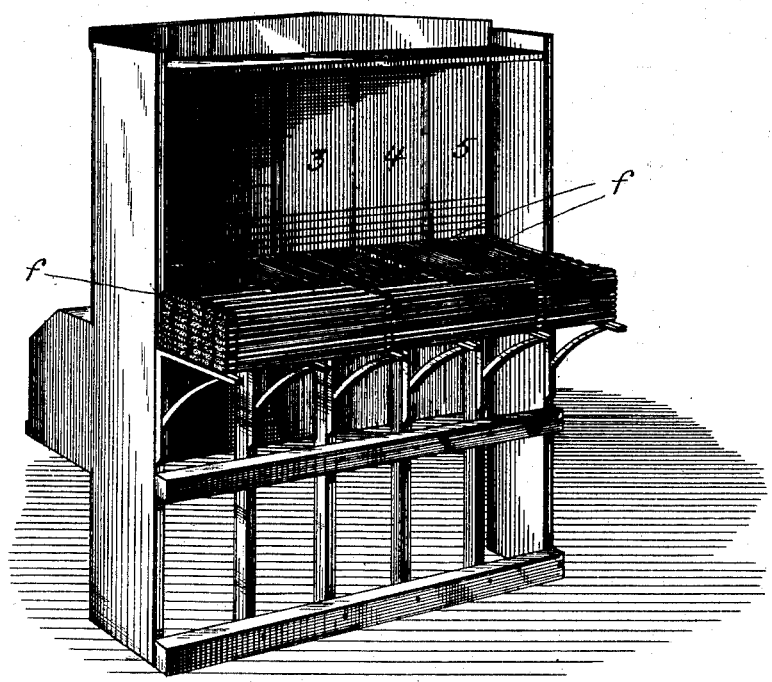

(No Model.)　　　　　　　　　　　　　　　2 Sheets—Sheet 1.
C. E. SCRIBNER.
CABLING SYSTEM FOR MULTIPLE SWITCHBOARDS.

No. 503,555.　　　　　　　　Patented Aug. 15, 1893.

Witnesses:
Chas. G. Hawley
Ella Edler

Inventor:
Charles E. Scribner
By George P. Barton
　　　Attorney.

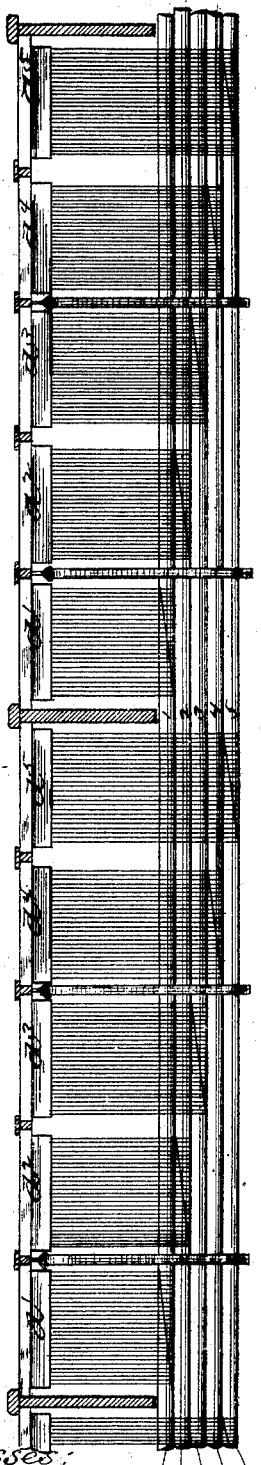

UNITED STATES PATENT OFFICE.

CHARLES E. SCRIBNER, OF CHICAGO, ILLINOIS, ASSIGNOR TO THE WESTERN ELECTRIC COMPANY, OF SAME PLACE.

CABLING SYSTEM FOR MULTIPLE SWITCHBOARDS.

SPECIFICATION forming part of Letters Patent No. 503,555, dated August 15, 1893.

Application filed October 15, 1888. Renewed December 21, 1891. Serial No. 415,713. (No model.)

*To all whom it may concern:*

Be it known that I, CHARLES E. SCRIBNER, a citizen of the United States, residing at Chicago, in the county of Cook and State of Illinois, have invented a certain new and useful Improvement in Cabling Systems for Multiple Switchboards, (Case No. 151,) of which the following is a full, clear, concise, and exact description, reference being had to the accompanying drawings, forming a part of this specification.

My invention relates to making the connections and laying up the cables at the rear of multiple switch boards of a telephone exchange and its object is to place the cables containing the wires and to make the connections between the wires of the cable and the switches upon the switch board in such manner that all the connections may be readily accessible for inspection or repairs.

In Letters Patent No. 385,846, granted James A. Cook and Frank B. Cook July 10, 1888, is shown a system of wiring which discloses the prior state of the art. In my system as herein described the cables are run directly from one switch board to the other in layers, each layer containing as many cables preferably as there are divisions upon each of the switch boards. Each cable is connected with corresponding spring jack switches on each of the switch boards, the spring jack switches or strips of spring jack switches with which the different cables of each layer of cables are connected being preferably in the same horizontal plane. Thus the cables are run in layers behind the switch boards, the connections with the cable of any layer nearest the board being, say with the strip in the first section of each of the boards, the connections with the next cable being run over the first cable and connected with the proper strip of spring jacks in each section 2 of the different switch boards, the third cable being connected in the same manner with the strip directly in front in section 3 of each board and so on as to each of the other cables of the layer. Thus the spring jack switches of one layer of cables would be in the same plane preferably and would form a line of spring jack switches across all the boards, and the cables being flattened as shown a layer will not be of greater thickness than that of the spring jack strips forming the line immediately in front of the layer of cables. Thus the layers of cables may be brought into substantially the same planes respectively as the lines or superimposed parallel rows of spring jack switches with which their wires are connected. In the Cook and Cook system the different layers are supported upon pins and each strip of spring jack switches is connected with its cable by wires which are bound together where they enter the cable. In my system each cable is divided up at the rear of the board into as many short cables as there are boards. The wires are run from the different ends of the two pieces at the rear of each strip independently, so that on drawing out any strip of spring jacks to the rear of the board these connecting wires, running to the different ends of the two pieces, will shear across each other, thus permitting the two ends of the cable to spread apart so as to permit the strip to be drawn back to the rear behind the mass of the cables.

Instead of supporting the different layers on different rows of pins as in the Cook and Cook system I preferably permit the different layers to lie directly upon one another, especially where the number of cables is large and where the strips of spring jack switches are thin. I permit the different layers to rest directly upon one another and preferably at intervals put bands or slings around each separate layer, these slings being attached to the frame so as to take the strain off from the connecting wires when the cables are lifted in mass to separate them to permit of the removal of any one of them. These bands serve to separate each of the layers of cables from other layers so that the cables of each layer may be moved together as desired.

The length of the connecting wires is such that sufficient slack is afforded to permit any strip of spring jack switches to be withdrawn to the rear of the mass of cables so that its connections may be examined or repaired, while the slings are somewhat shorter than the connecting wires, thus preventing the connecting wires from being broken.

My invention is illustrated in the accompanying drawings in which—

Figure 2:
Figure 3:
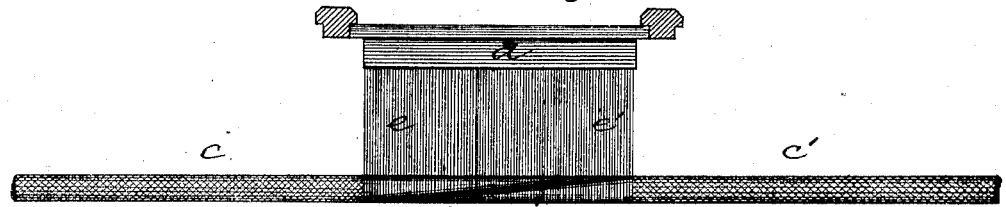
Figure 4:
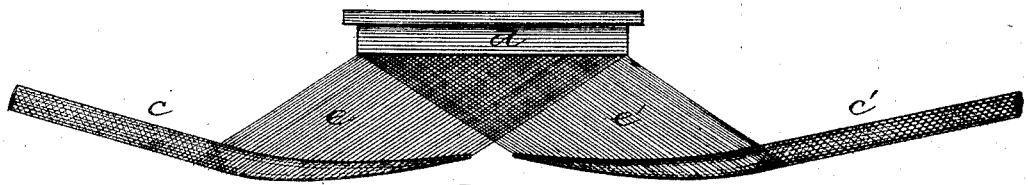

Figure 1 is a rear perspective view of a multiple switch board showing the cables in layers and the connections with the spring jack switches of the upper layer. Fig. 2 is a detailed view showing a sling around one of the layers and the connection of the sling with the frame of the switch board. Fig. 3 is a plan showing the abutting ends of two pieces of a cable connected with a strip of spring jack switches. Fig. 4 shows the manner of removing a strip of spring jack switches to the rear, the connecting wires of the different ends of the two pieces of cable being bent or flexed in different directions so as to permit the two ends to separate so as to afford sufficient slack. Fig. 5 is a plan showing the connections of a layer of cables with a line of spring jack switches. Fig. 6 is a detailed view showing a single spring jack switch and its connections with the cable.

Like parts are indicated by similar letters and figures of reference throughout the different views.

The switch board shown in Fig. 1 consists of five divisions 1, 2, 3, 4, 5. There may be as many such switch boards in the exchange as may be required to furnish room for the operators to do the switching.

As is usual in multiple switch board systems the boards are duplicates of one another and are provided each with a switch or terminal for each of the telephone lines and these terminals are preferably spring jack switches made in strips, each strip containing twenty. A test wire is required to make the connections with the series of spring jack switches on the different boards of each telephone line. As shown in Fig. 6 the telephone line $a$ is connected with the spring $a'$ of the switch and its circuit may be traced to the contact $a^2$ of the switch and thence by wire $a^3$ into the cable. The test wire $b$ is connected with the test spring $b'$ of the switch. The cable is composed of as many pieces $c\,c'$ as there are switch boards, each piece being long enough to reach from a strip of spring jack switches on one board to a corresponding strip on the next board. Two different pieces $c\,c'$ of a cable are shown in Figs. 3 and 4, and the manner of connecting their wires with the switches of the strip $d$; the connecting wires $e$ of piece $c$ as shown in Fig. 3 are run directly to the appropriate contacts of the switches of strip $d$, and the connecting wires $e'$ of piece $c'$ are likewise connected with the appropriate contacts of the same switches. The connecting wires $e$ and $e'$, however, are kept separate, that is, they are not interlaced or bound together, and they are of sufficient length to permit of the withdrawal of the strip $d$ as shown in Fig. 4. When a strip $d$ is withdrawn connecting wires $e$ are flexed in one direction and connecting wires $e'$ in the opposite direction as the ends of the pieces $c\,c'$ are drawn apart as shown in Fig. 4. As shown in the Cook and Cook patent No. 385,846 the ends of the different pieces or parts of the different cables are laced together so that they cannot be drawn apart to afford sufficient slack to permit of the withdrawal of any strip to the rear of the mass of cables.

I believe myself to be the first to provide slack in the cables when run from one board directly to the other for the purpose of permitting the withdrawal of any strip of spring jack switches to the rear of the mass of cables. The means for accomplishing this result consists in the connecting wires $e$ and $e'$ of suitable length run independently without binding the ends of the cable together so that the corresponding connecting wires $e\,e'$ may be bent in different directions so as to shear across one another and permit the ends of the pieces of cable $c\,c'$ with which these wires are connected to separate. I do not limit myself, however, to the specific construction described, since there are other ways of affording slack in the cables which would readily suggest themselves to those skilled in the art.

In the plan shown in Fig. 5 cable 1 is connected with a strip of spring jacks $d'$ of division 1 of the first board and also with a corresponding strip $d'$ of division 1 of the second board; cable 2 is in like manner connected with a strip $d^2$ of each of the divisions 2 of the different boards; cable 3 is connected in the same manner with a strip $d^3$ on each of the boards; cable 4 with a strip $d^4$ on each board and cable 5 with a strip $d^5$ on each board. Thus one layer of cables 1, 2, 3, 4, 5, carries the wires for the connections with a line of strips $d$ across all the boards.

In Fig. 1, I have shown nine such layers of cables; it will be understood that the number of cables in each layer will depend upon the number of divisions in each of the boards, while the number of layers will correspond to the number of strips of spring jack switches in each division.

As shown in Fig. 2 the sling $f$ is attached at $g$ to the frame of the switch board; this sling $f$ is preferably somewhat shorter than the connecting wires $e$, $e'$ and is designed to take the strain off from the connecting wires when the layers of cable are spread apart as is necessary when a cable or a strip of spring jack switches is taken out.

Having thus described my invention, I claim as new and desire to secure by Letters Patent—

1. The combination with multiple switch boards of cables carrying the telephone and test wires extending directly from one board to the other, said cables being placed in layers, the cables in each layer corresponding in number to the number of divisions on each of the switch boards and each cable being connected with corresponding spring jack switches on each board, said cables being composed of sections corresponding in number to the number of boards, the connecting wires with the different strips of spring jack switches being independent, whereby any strip of spring jack switches may be withdrawn to the rear of the mass of cables substantially as described.

2. The combination with multiple switch boards of cables carrying the wires connected with the switches thereon, said cables extending directly from one board to another and each cable being connected with corresponding removable spring jack switches on each of the boards, each cable consisting of as many pieces or parts as there are switch boards and the wires forming the conductors of each part being longer than the direct distance horizontally between the switches, with which corresponding parts of the same cable are connected, whereby any strip or set of spring jack switches may be withdrawn to the rear of the mass of cables substantially as and for the purpose specified.

3. The combination with the layers of cables at the rear of multiple switch boards, of slings $f$ whereby said layers are kept distinct and the strain taken off from the connecting wires substantially as described.

4. The combination with a piece $c$ of cable of a corresponding piece $c'$, a strip of spring jack switches $d$ and the connecting wires $e\,e'$, said connecting wires being independent of one another and adapted to be flexed in different directions to permit the pieces or parts $c\,c'$ to be separated substantially as and for the purpose specified.

5. The combination with two or more multiple switch boards of layers of cables supported at the rear thereof, said layers resting directly upon one another, the number of cables in each layer corresponding to the number of divisions in each switch board and the number of layers corresponding to the number of rows or strips of switches in each division and the slings $f$ around the different layers for keeping the layers distinct and preventing injury to the connecting wires substantially as described.

6. Groups of cables at the rear of multiple switch-boards, the wires of the cables being connected to spring-jack switches in the usual manner, the cables being slack between the sub-divisions of the switch-board whereby any strip of spring jack switches may be withdrawn to the rear of the mass of cables, as described.

7. The combination with telephone switch boards made up of duplicate divisions, of switches upon the different boards, connecting conductors between the corresponding terminals of corresponding switches, the conductors being arranged in substantially the same plane with the switches with which they are connected and being secured together by bands or slings; substantially as and for the purpose specified.

8. The combination with two or more multiple switch boards with which the same telephone lines are connected, of removable strips of spring jack switches and connecting conductors for connecting corresponding contacts of corresponding switches of different strips of the different boards together, said conductors being placed in substantially the same plane and having their ends bent at right angles and united to the switch terminals and having the parts between the bent portions bound together to form a layer, said layer containing as many sections as there are switch boards, and being of substantially the same thickness as the corresponding spring jack switches placed in the same plane therewith and with which the wires of the layer of cables are connected.

9. The combination in a multiple switch board system of two or more switch boards and switches upon the different switch boards, of wires connecting corresponding switches upon the different boards, said wires being bound together to form a mass composed of sections with their ends turned up to connect with the switches.

10. The combination in a multiple switch board system, of two or more switch boards and switches upon the different boards, wires connecting corresponding switches upon the different boards, the wires belonging to a line of strips of spring jack switches being arranged in cables in substantially the same plane as said line of strips and combined together to form one integral, whereby the cables at the rear of the board are formed into as many integral parts or layers as there are lines of strips of spring jack switches, substantially as described.

In witness whereof I hereunto subscribe my name this 10th day of October, A. D. 1888.

CHARLES E. SCRIBNER.

Witnesses:
   CHAS. G. HAWLEY,
   GEORGE P. BARTON.